United States Patent [19]

Wolgast

[11] Patent Number: 4,897,847

[45] Date of Patent: Jan. 30, 1990

[54] MIRROR TRANSLATION APPARATUS FOR ALTERING FOCAL POINT POSITION IN A LASER

[75] Inventor: Stephen Wolgast, Fremont, Calif.

[73] Assignee: Spectra Physics, Inc., San Jose, Calif.

[21] Appl. No.: 103,009

[22] Filed: Sep. 30, 1987

[51] Int. Cl.[4] .............................................. H01S 3/20
[52] U.S. Cl. ...................................... 372/54; 372/15; 372/101; 372/107
[58] Field of Search ................... 372/54, 107, 108, 99, 372/9, 15, 16, 20, 33, 92, 101; 350/631–633, 635

[56] References Cited

U.S. PATENT DOCUMENTS

| 3,443,243 | 5/1969 | Patel ................................ | 372/20 |
| 4,081,765 | 3/1978 | Berg et al. ........................ | 372/24 |
| 4,674,097 | 6/1987 | Fountain ........................... | 372/54 |

FOREIGN PATENT DOCUMENTS 3236915  4/1984  Fed. Rep. of Germany ...... 372/107

Primary Examiner—William L. Sikes
Assistant Examiner—B. R. R. Holloway
Attorney, Agent, or Firm—Irell & Manella

[57] ABSTRACT

There is disclosed an apparatus for translating the focal points of curved mirrors in a dye laser along a straight line comprising an experimentally selected pivot point for each mirror and a means for causing each mirror to pivot about its pivot point. Rotation of the mirror about the pivot point causes the incoming beam to strike the mirror in a different place on the curved surface such that the angle of reflection changes in such a manner as to compensate for the arcuate movement of the mirror around the pivot point. Also disclosed are hinge designs to allow a mirror to pivot about an apparent pivot point which is much farther away from the mirror than the hinge. Also disclosed are methods for attaching the mirror supports to the laser frame in dye laser construction and for tuning the dye laser so constructed for optimum lasing efficiency.

8 Claims, 4 Drawing Sheets

MIRROR TRANSLATION APPARATUS FOR ALTERING FOCAL POINT POSITION IN A LASER

BACKGROUND OF THE INVENTION

The invention pertains to the field of optical apparatus for dye lasers, and, more particularly, the field of translation of mirrors in a dye laser to change the position of the focal point.

In dye lasers, a narrow jet of fluorescent dye under pressure is formed in a laser cavity. The laser cavity is defined by a plurality of mirrors which reflect light emitted from the dye during lasing action. The light is reflected back and forth within the cavity and passes through the dye jet repeatedly. Another mirror called the "pumping mirror" resides outside the laser cavity. This mirror receives a beam of coherent excitation light from a pump laser and reflects this excitation light toward the dye jet as an excitation beam. The excitation beam may be of steady intensity (called continuous wave) or it may consist of pulses. The pulses can have any duration, repetition rate or light frequency. Maximum pulsed dye laser performance occurs when the excitation beam frequency (color) is close to the dye laser frequency and the repetition rate of the excitation beam matches the round trip time of the dye laser cavity (known as synchronous pumping). The purpose of the excitation light beam is to input sufficient energy to cause the dye molecules in the jet to jump to higher energy states. When the dye jet molecules fall back to their lower energy states either spontaneously or through stimulated emission, they emit photons of light all of which have the same frequency and the same phase. This emitted light is called coherent.

A laser uses this process in performing light amplification by stimulated emission. The mirrors which define the laser cavity serve to collect the photons emitted from the dye jet and focus and reflect this energy back through the dye jet. As the photons pass through the dye jet, they trigger further emissions of photons of the same frequency and phase. That is, light emitted from the dye jet when dye molecules drop to lower energy states is reflected back and forth in the laser cavity and causes further dye molecules to drop to lower energy states to emit further photons. This process is called stimulated emission.

There are multiple mirrors in the laser cavity, two of which are placed on either side of the dye jet. These two mirrors are curved and serve to reflect and to focus the emitted light from the dye such that the narrowest point in the beam of light reflected between these two mirrors is within the dye jet. This concentrates the maximum amount of energy from the emitted photons in the dye jet and triggers the maximum number of stimulated emissions.

It is important to efficient laser action that the excitation light which pumps the dye molecules to higher energy states be focused properly by the curved pump mirror. The focus must be such that the beam of excitation light has a focal point within the dye jet. There also must be a maximum amount of overlap between the focal point of the excitation beam and the volume of the dye jet which is illuminated by the laser cavity beam being reflected between the two curved mirrors on either side of the dye jet. This causes the greatest efficiency in exciting dye molecules to create the necessary population inversion, i.e., a greater number of dye molecules in higher energy states than in lower energy states. The degree of overlap is related to the efficiency of creating stimulated emission. In other words, when there is maximal overlap, the photons being reflected within the laser cavity pass through the area of the dye jet which has the most number of excited dye molecules. This maximizes the number of stimulated emission photons released.

To maximize the efficiency of creating the population inversions and the efficiency of causing stimulated emission, it is important to be able to move the focal points of the pump mirror and the two mirrors in the laser cavity on either side of the dye jet. By being able to move the focal points of the mirrors on either side of the dye jet, the narrowest portion of the beam within the laser cavity may be placed within the volume of the dye jet. By being able to move the focal point of the pump mirror, the focal point of the excitation energy may be placed within the intersection of the laser cavity beam the dye jet.

In the prior art, the two mirrors on either side of the dye jet and the pump mirror were translated to move their focal points using several different methods. In one method, the mirror was placed on a plate of square or rectangular configuration. At three of the four corners of the plate, were placed screws which passed through threaded holes in the plate and which were coupled to rotatable bearings in the frame of the laser. When any one of these screws was turned, the entire plate would pivot on an axis defined by the center points at which the other two screws supported the plate. Because an edge of the plate rotated through an arc when any one of the screws was turned, the mirror would move closer to or further away from the dye jet. This would cause the focal point of the mirror to move closer to or further away from the dye jet also. Unfortunately, the fact that the mirror was pivoting also changed the angle between the incoming beam and the outgoing beam reflected from the mirror. A change in the angle, if not corrected, would move the focal point out of the dye jet or away from the position of maximum lasing efficiency. Therefore, to make such an arrangement work to translate the focal point, it was necessary to adjust all three screws so as to maintain the proper angle and move the focal point to the desired position. This was a painstaking and time consuming process, and was disadvantageous.

Another structure used in the prior art to translate the focal point of the mirror achieved true independent focal point translation without changing the angle between the incoming beam and the outgoing beam. This structure is referred to as the "translation stage". In such a device, the mirror was moved linearly by movement of a plate to which the mirror was attached along another plate to which the first plate was coupled by bearings. The mirror was also coupled to another support structure by several screws which could be turned to change the angle of the mirror if the angle between the incoming beam and the outgoing beam was to be changed. This support structure was then attached to the translation stage. This allowed the composite structure to be rolled linearly back and forth along a straight line relative to the laser base. The translation stage was coupled to the laser base such that the straight line of movement brought the mirror closer to or further away from the dye jet in a direct line between the mirror and the dye jet. This allowed the focal point of each mirror so mounted to be moved closer to or further away from the dye jet. Thus, when the focal point was translated relative to the dye jet, the angle between the input beam and the output beam was not changed since movement of the translation stage did not change the angle of the mirror.

The disadvantage with this approach is the expense of the translation stage. Since several mirrors have to have their focal points adjusted in a dye laser, the expense of the translation stage for each such mirror adds significantly to the cost of the product.

Thus, there has arisen a need for a simple, inexpensive apparatus for adjusting the position of the focal point of a curved mirror in a dye laser which allows the position of the focal point to be changed by a single movement which allows the position of the focal point to be moved along what is essentially a straight line.

SUMMARY OF THE INVENTION

According to the teachings of the invention, there is disclosed herein a mirror focal point translation apparatus using a hinge and a lever arm. The hinge is attached to the laser frame at a position which is relatively far away from the mirror. The pivot point is chosen experimentally. The pivot point is chosen such that the mirror moves along an arc and the focal point of the mirror moves along what is essentially a straight line. The focal point moves along a straight line because the pivot point is selected such that as the mirror moves along the arc, the incoming beam strikes the mirror at a different point along the curve of the mirror surface. The changed point of contact of the incoming beam causes the angle of reflection to change. The pivot point is selected such that the change in the angle of reflection compensates for the movement of the mirror along the arc such that the focal point moves along an essentially straight line.

It is preferable to pick the pivot point as far as possible away from the mirror within the constraints of packaging of the laser. Points which are far away from the mirror cause the mirror to move along an arc which is flatter because the radius of curvature is larger. This causes the focal point of the mirror to be translated along a line which is essentially linear.

The pivot point is also selected such that the path of movement of the focal point is through the optimum position for maximum efficiency of laser operation.

There is also disclosed several hinge designs which may be used to attach the lever arm to the laser base to simulate pivot points which are very far away from the position of the mirror being moved. One such hinge design utilizes a slide plate which is coupled to the mirror being translated and which has a curved under surface. This curved under surface slides along a curved cam surface. The cam surface has a radius of curvature which is very large. This causes the pivot point of the mirror to be the apparent radius of curvature of the cam surface.

Another hinge design utilizes two flat plates which are connected by two lever arms at either end thereof. Each lever arm is pivotally connected at one end to one of the plates. The mirror is attached to one of the plates while the other plate is attached to the laser frame. The plate attached to the mirror may then be moved along an arc which has a very large apparent radius by the pivoting action of the two connecting arms.

DETAILED DESCRIPTION OF THE PREFERRED EMBODIMENT

Figure 1:
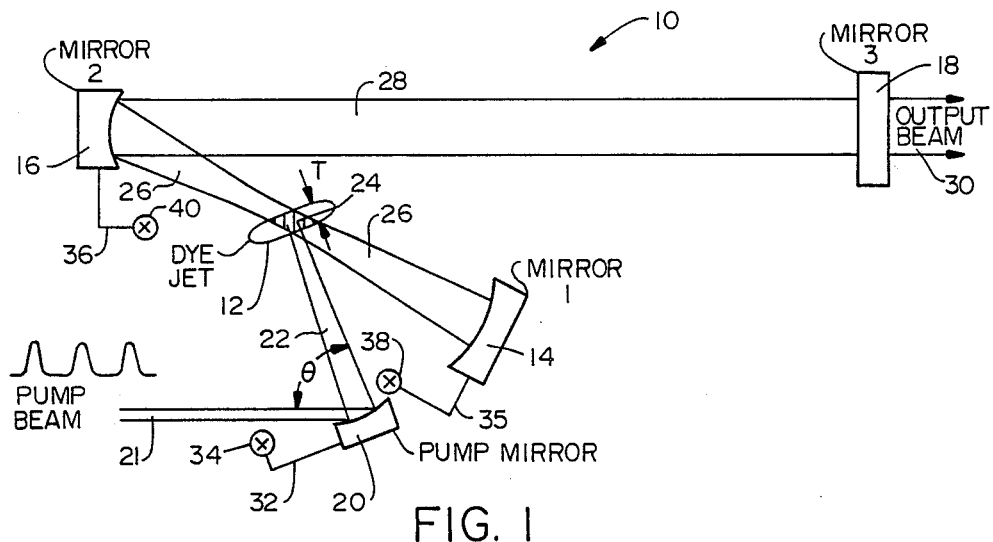
FIG. 1 is schematic diagram of a typical dye laser.

It will be appreciated that the present invention is useful in all dye lasers including but not limited to synchronously pumped, continuous wave (CW) and pulsed lasers. Referring to FIG. 1, there is shown schematically a diagram of a typical dye laser. The dye laser of FIG. 1 uses mirror translation apparatus according to the teachings of the invention, and this apparatus is also shown schematically. The dye laser 10 is comprised of a dye jet 12 which has a thickness T which is on the order of 0.01 inches. This dye jet is formed by pumping a dye through a nozzle (not shown) using pumps and a circulatory system (also not shown) such that the dye jet occurs in free space. That is, the dye jet occurs between the nozzle of the jet and a receiver apparatus (not shown) which collects the dye and recirculates it back to the pump which pumps it to the dye jet nozzle.

A laser cavity is defined by the mirrors 14, 16 and 18 which are labeled, respectively, mirrors 1, 2 and 3 in FIG. 1. This laser cavity defines an optical path which is traveled by light emitted from the dye jet during lasing action.

For lasing action to occur, dye molecules in the dye jet must first be excited to higher energy states. This is done using coherent excitation light in a pump beam 21 which is directed to and focused upon the dye jet 12 by a pump mirror 20. The pump mirror receives this beam 21 of excitation light in the form of coherent light from another laser designated the pump laser (not shown). The pump beam 21 may be comprised of a train of pulses of excitation light having a characteristic frequency F. The pump mirror 20 is arranged such that the incoming pump beam 21 is reflected at an angle theta and becomes the converging beam 22. The beam 22 is focused by the pump mirror 20 so that its focal point, shown at 24, lies within the intersection volume between the dye jet 12 and a beam of light 26 being reflected between the mirrors 14 and 16 in the laser cavity.

In operation, the photons of the excitation beam 22 supply energy to dye molecules in the dye jet 12, thereby raising them to higher energy states. Some of these dye molecules spontaneously drop down to lower energy states and release photons in the process. These photons are emitted from the dye jet 12 and are focused by the mirrors 14 and 16 into the beam shown at 26.

Light falling upon the mirror 16 from the dye jet 12 is reflected at mirror 16 and becomes a beam 28. This beam is reflected from the mirror 18 and travels back to mirror 16. This light is reflected from mirror 16 back toward and through the dye jet as the beam 26. This beam is reflected from the mirror 14 back toward and through the dye jet 12 toward the mirror 16.

In one embodiment, synchronously pumped dye laser, the frequency F of the excitation light pulses in the beam 22 is set to coincide with the round trip travel time for a photon from mirror 14, to mirror 16, to mirror 18, back to mirror 16, and then back to mirror 14. As the photons in beam 26 pass through the dye jet 12, they stimulate further emissions by causing dye molecules in the dye jet 12 which are still in excited energy states to drop down to lower energy states and emit more photons having the same frequency and phase as photons in the beam 26. This causes coherent laser light to be generated in a process which is essentially amplification of light. As this emitted energy is reflected back and forth in the laser cavity, some of the energy escapes as an output beam 30 through the mirror 18. This mirror has a commercially available optical coating such that not all the photons striking it are reflected. With the synchronously pumped dye laser, matching of the frequency of the excitation light pulses in the excitation beam 22 to the round trip travel time of a photon in the laser cavity helps to maximize the efficiency of lasing. This is because photons generated by a first excitation pulse resulting from spontaneous transition of dye molecules to lower energy states travel through the laser cavity and return to the dye jet at the same time that the next excitation light pulse arrives. The next excitation light pulse excites further dye molecules to higher energy states in addition to those dye molecules which were excited by the earlier pulse. When the photons from the first excitation pulse arrive at the dye jet, they stimulate emissions from more dye molecules, thereby increasing the number of photons of the same frequency and same phase which are traveling back and forth in the laser cavity.

Optimization of the above described lasing action depends upon the ability to focus the beam 26 such that the narrowest section of the beam intersects the dye jet 12. This maximizes the intensity of the light energy falling on the zone of dye molecules where the population inversion exists. Optimization also depends upon the ability of the pump mirror 20 to focus the excitation beam 22 such that the focal point 24 lies within the volume of the dye jet 12 which is intersected by the beam 26. The volume of this intersection is shown by cross hatching within the dye jet 12. The focal point 24 of the beam 22 is the area within the dye jet where the most dye molecules are being excited to higher energy states. By keeping the focal point of the beam 26 such that the narrowest portion of the beam lies within the dye jet 12 in the same area where the maximum population inversion exists, the maximum intensity of stimulated emission occurs. The above optimization process is carried out by changing the focal points of the mirrors 20, 14 and 16. The focal points of mirrors 14 and 16 are varied to enable placement inside the dye jet 12 of the smallest diameter portion of the beam 26. Variation of the focal point of the pump mirror 20 is accomplished so as to place the focal point 24 of the excitation beam 22 within the intersected volume between the beam 26 and the dye jet 12.

In the prior art, translation of the focal point of mirrors 14, 16 and 20 could be accomplished by attaching these mirrors to translation stages. In the case of mirrors 14 and 16, the translation stages would be coupled to the laser frame (not shown) so as to translate the mirrors 14 and 16 linearly along the center line of the beam 26. This would allow the focal points of these mirrors to be moved into or out of the dye jet 12. The focal points of mirrors 14 and 16 will be the narrowest portion of the beam 26. Likewise, the pump mirror 20 was mounted on a translation stage which is attached to the dye laser frame so as to move the pump mirror linearly along the axis of the excitation beam 22. However, such a technique would be too expensive for use in all but the very best laser products.

A less expensive technique for moving the focal points of the mirrors 20, 14 and 16 is to attach these mirrors to lever arms which in turn are pivotally attached to the laser frame at points which are experimentally determined to cause the focal points of the mirrors to move along a segment of an arc which is substantially a straight line within a few thousandths of an inch. In the case of pump mirror 20, a lever arm 32 couples the mirror 20 to a pivot point 34 on the laser frame. Likewise, mirrors 14 and 16 are coupled via lever arms 35 and 36 respectively, to pivot points 38 and 40, respectively.

Figure 2:
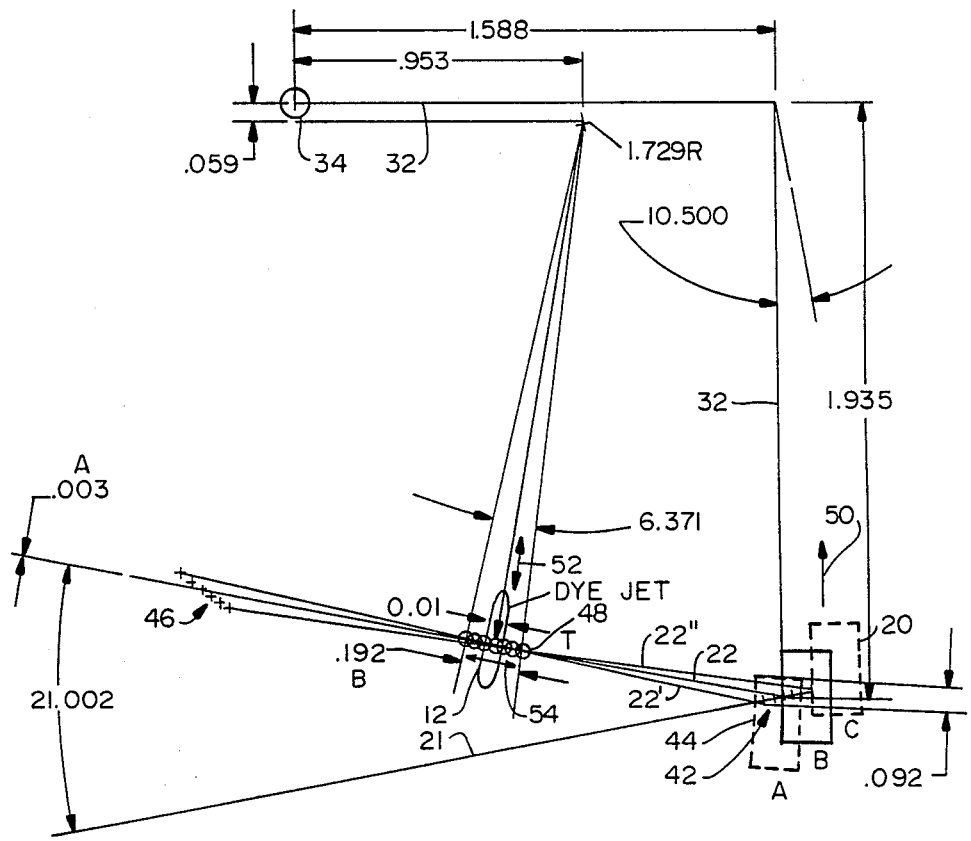
FIG. 2 is a detailed diagram of the relationship of the pump mirror to its experimentally determined pivot point for one application according to the preferred embodiment of the invention.

Referring to FIG. 2, there is shown a more detailed diagram of the relationship between the pump mirror 20 and the pivot point 34. As is seen from FIG. 2, when the pump mirror 20 is rotated about the pivot point 34, the mirror moves along the perimeter of a circle centered at pivot point 34. As the mirror moves, the point at which the incoming excitation beam 21 strikes the curved surface 44 of the mirror changes. The point at which the incoming beam 21 strikes the mirror surface are shown generally by a series of crosses at 42. Because these points are changing with movement of the mirror around the pivot point 34, the incident angle between the curved surface 44 and the incoming beam 21 also changes. This slightly changes the angle at which the excitation beam 22 leaves the curved surface 44 of the mirror. The extremes of the angles traced by the beam 22 resulting from movement of the pump mirror from position A to position C are outlined in FIG. 2 and are shown at 22' and 22". In other words, the excitation beam 22 will form an angle to the curved surface which is somewhere within the lines labeled 22' and 22" in FIG. 2. The position of the pivot point 34 is experimentally selected so that the changes in angle of the excitation beam 22 compensate for the movement of the mirror 20 along an arc such that the focal points shown generally at 48 move along what is essentially a straight line.

The series of x's shown generally at 46 in FIG. 2 define the radius of curvature of the curved surface 44 for several of the positions between the position A and the position C depicted in FIG. 2. The focal points resulting from the movement of the mirror between position A and position C in FIG. 2 are shown generally at 48. Generally, the focal points 48 lie approximately halfway between the curved surface 44 and the center of curvature for any particular position shown at 46. FIG. 2 shows the actual dimensions in inches which were chosen experimentally for the pivot point 34 for a pump mirror according to the preferred embodiment of the invention. There are multiple pivot points 34 which exist and which can be found experimentally all of which will lead to a similar or identical result. For the particular relationship between the pump mirror 20 and the pivot point 34, note that the focal points 48 resulting from translation of the mirror from position A to position C trace an arc which deviates from a straight line by only a few thousandths of an inch as shown at dimension A. Translation of the mirror 20 along a segment of the perimeter of the circle centered at 34 would normally cause the focal point 48 to trace a similar segment of the perimeter of a circle but for the fact that the angle between the beams 21 and 22 changes in such a manner as to compensate. This compensation causes the focal points 48 to trace essentially a straight line. The degree to which the focal points 48 deviate from a precisely straight line for the movements shown in FIG. 2 is shown by dimension A which is 0.003 inch. In other words, for movement of the focal points 48 a distance equal to the dimension B or 0.192 inches, the degree of non linearity of the line traced by the focal points 48 is only 0.003 inches. Since the dye jet 12 is generally only 0.01 inches across, the entire range of movement of 0.192 inches is not needed to insure that the focal point is within the dye jet 12. Because only a fraction of the range of movement equal to dimension B is needed, the dimension A can be essentially ignored and it can be safely assumed that focal points 48 trace a straight line.

Because many different points can be selected for the pivot point 34, the dimensions shown in FIG. 2 are exemplary only and are not critical to the practice of the invention. Pivot points 34 which are farther away from the pump mirror 20 cause the pump mirror 20 to be translated along circles of larger radius. The larger the radius of the circle, the more closely will the movement of the pump mirror 20 from position A to position C approximate a straight line. If the movement of the mirror from position A to position C is essentially a straight line, the line traced by the focal points 48 will also be essentially a straight line. In other words, the farther away pivot point 34 is from pump mirror 20, the less compensation is necessary by a changing angle between the incoming beam 21 and the outgoing beam 22 to insure that the focal points 48 trace an essentially straight line. Packaging limits as to the size of a dye laser which is acceptable usually dictate how far away point 34 can be from the pump mirror 20 although there are hinge designs disclosed below which allow apparent pivot points which may lie outside the package entirely while still obtaining the benefits of the invention.

Note also that the change in angle between the incoming beam 21 and the outgoing beam 22 is not very large. If the pump mirror 20 were translated vertically along the direction shown by the arrow 50, the incoming beam 21 would strike the curved surface 44 at a different point along the surface for each new position of the mirror 20 but the change in impact point of the incoming beam would be more drastic per unit of translation distance than for the pivoting translation of the invention. This would cause substantially larger changes in the angle of reflection between beams 21 and 22 per unit of translation distance. With translation of the mirror 20 along an arc from position A to position C, the changes in angle between the beam 21 and the beam 22 still occur but they are not as large as in the case of a straight translation along the line defined by the arrow 50. The reason for this is that the mirror 20 is moving along an arc such that the points on the curved surface 44 at which the incoming beam 21 strikes the mirror do not move as much as in the case of a linear translation.

A tradeoff is achieved by using the mirror pivoting scheme of FIG. 2. Although the focal point translation process is not completely independent of the angle between the incoming beam and the outgoing beam, this angle does not change enough during translation of the focal point 48 to cause the problem of moving the focal point completely outside the perimeter of the dye jet. Thus, an essentially linear translation of the focal point 48 may be achieved by pivoting the mirror 20 about, the pivot point 34 without substantially changing the angle between the incoming beam 21 and the outgoing beam 22. Further, even though the angle between the incoming beam 21 and the outgoing beam 22 does change somewhat, this does not result in substantial movement of the focal point 48 in either direction along the double ended arrow 52. In other words, the objective of moving the mirror 20 is to allow the focal point 48 to be translated linearly along a line passing through the dye jet 12 which is parallel to the direction defined by the double ended arrow 54 without substantial movement of the focal point in either direction parallel to the double ended arrow 52. As can be gathered from the discussion above, the structure shown in FIG. 2 fills this need quite nicely despite the fact that the angle between the incoming beam 21 and the outgoing beam 22 does change somewhat during translation of the mirror 20 from position A to position C.

Figure 3:
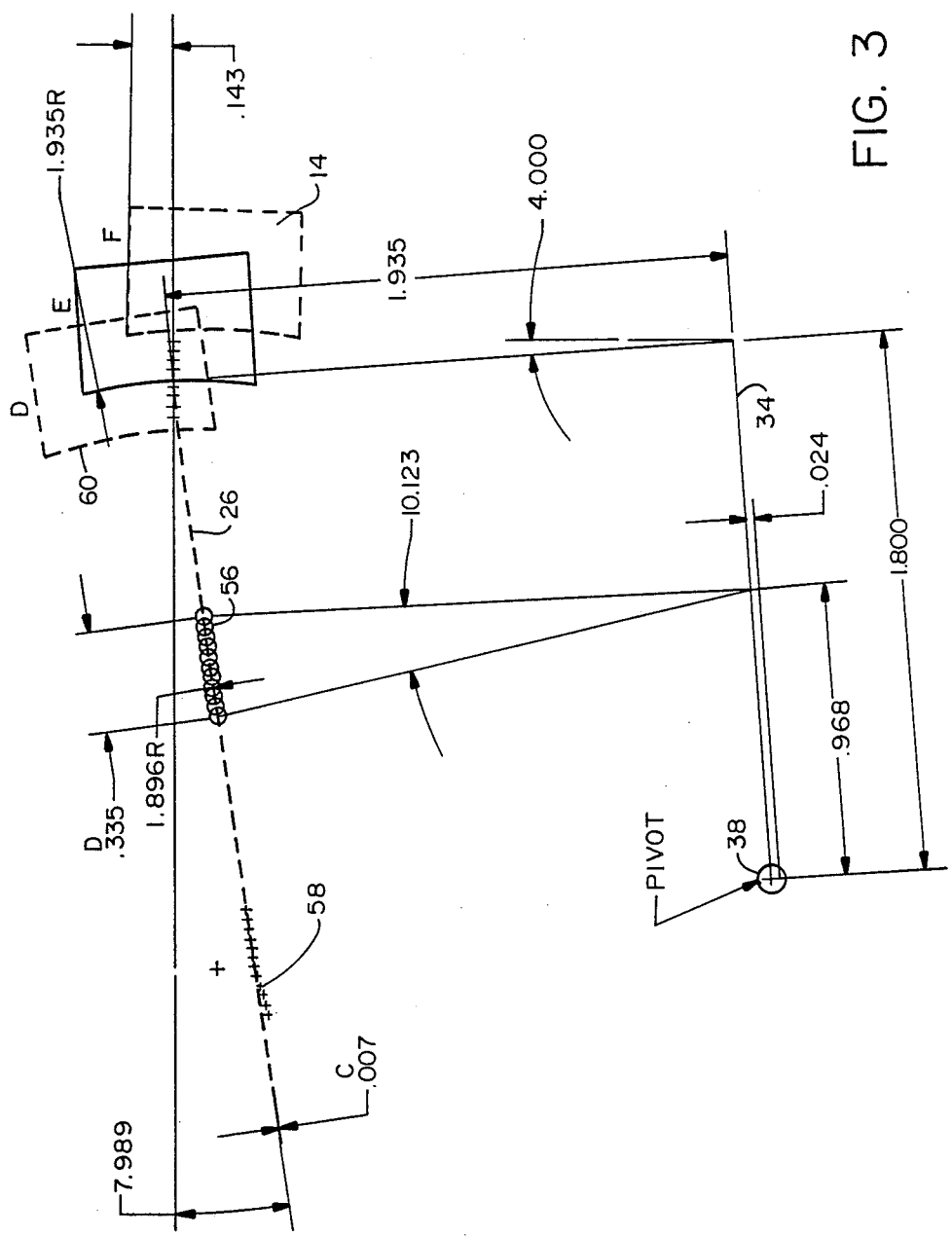
FIG. 3 is a detailed diagram of the relationship of the mirror 1 in the laser cavity to its experimentally determined pivot point for one application according to the preferred embodiment of the invention.

Referring to FIG. 3, there is shown a more detailed diagram of the relationship between mirror 14 and its pivot point 38. As in the case of FIG. 2, the pivot point 38 is experimentally determined to allow mirror 14 to be translated along a segment of the perimeter of a circle centered at pivot point 38. This allows the focal point of the mirror, shown generally at 56, to be translated along what is essentially a straight line. The focal points shown at 56 represent the focus of a number of discrete positions of the mirror 14 as it is translated from position D to position E to position F. As can be seen, the focal points trace essentially a straight line. The dimension C of 0.007 inch indicates the degree to which the focal points 56 trace a line which is not straight. In other words, 0.007 inch is the maximum deviation of any of the focal points 56 from a straight line as the mirror 14 is translated from position D to position F. Note that this translation results in movement of the focal point 0.335 inch as shown by dimension D. Again, as in the case of the structure shown in FIG. 2, dimension D represents a movement of the focal point which is far larger than is actually necessary to focus the beam 26 within the dye jet 12 (not shown). When dimension D is scaled down to the actual degree of translation needed, the dimension C becomes far less.

The crosses shown at 58 represent the centers of curvature of the curved surface 60 as that surface is translated from position D to position F.

Figure 4:
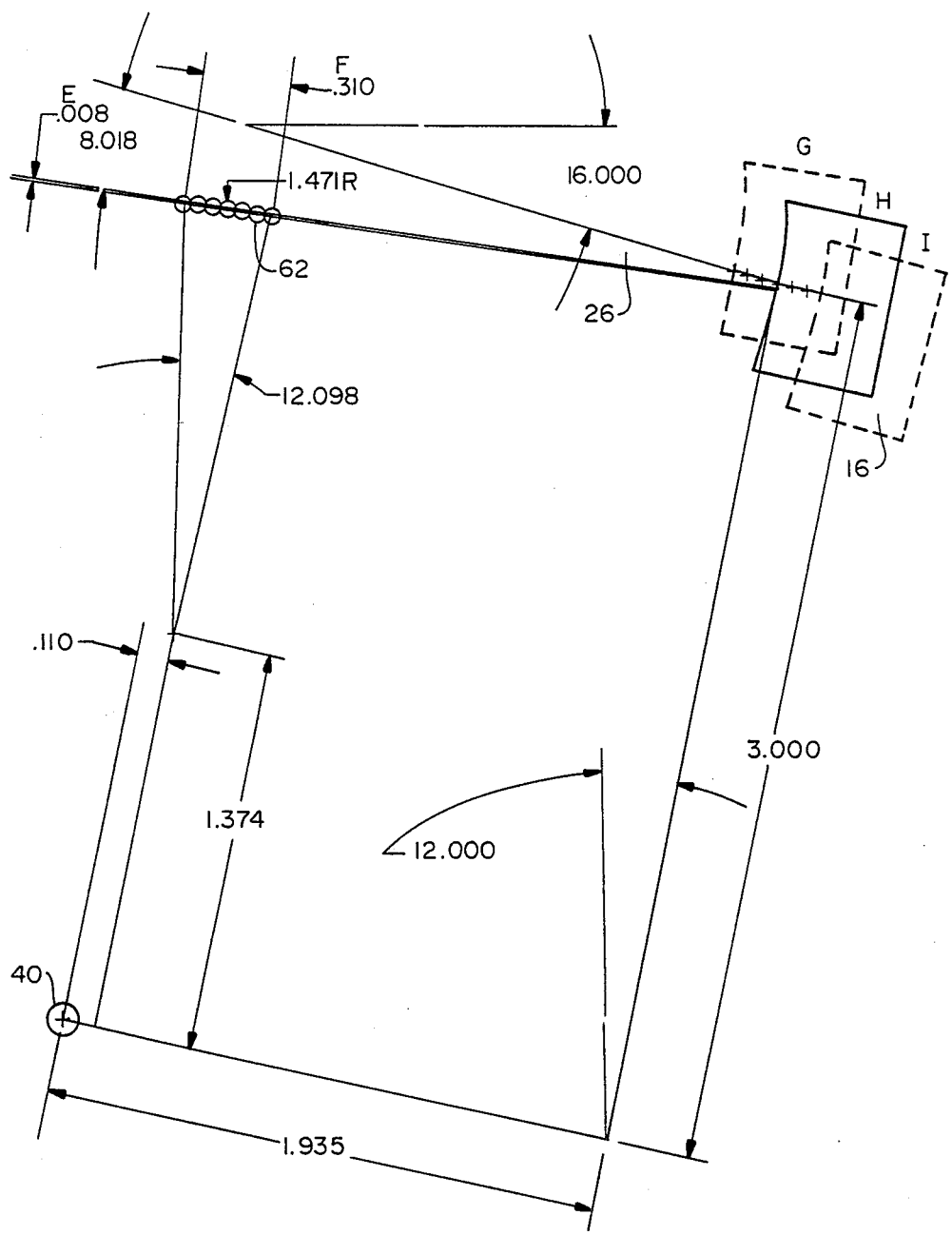
FIG. 4 a detailed diagram of the relationship of the mirror 2 in the laser cavity to its experimentally determined pivot point for one application according to the preferred embodiment of the invention.

Referring to FIG. 4 there is shown a diagram of the relationship between the mirror 16 and its pivot point 40. Again, the point 40 is picked experimentally to cause the focal points 62 to track what is essentially a straight line as the mirror 16 is translated between the positions G, H and I. Note that the degree of nonlinearity of the line traced by the focal point 62 as it is translated 0.310 inch is shown by the dimension E and is 0.008 inch. Again, the translation of 0.310 inch as shown at dimension F is more than is necessary to focus the focal point of the mirror 16 within the dye jet (not shown). When the range of translation is reduced to the actual range needed, the dimension E becomes substantially smaller.

Figure 5:
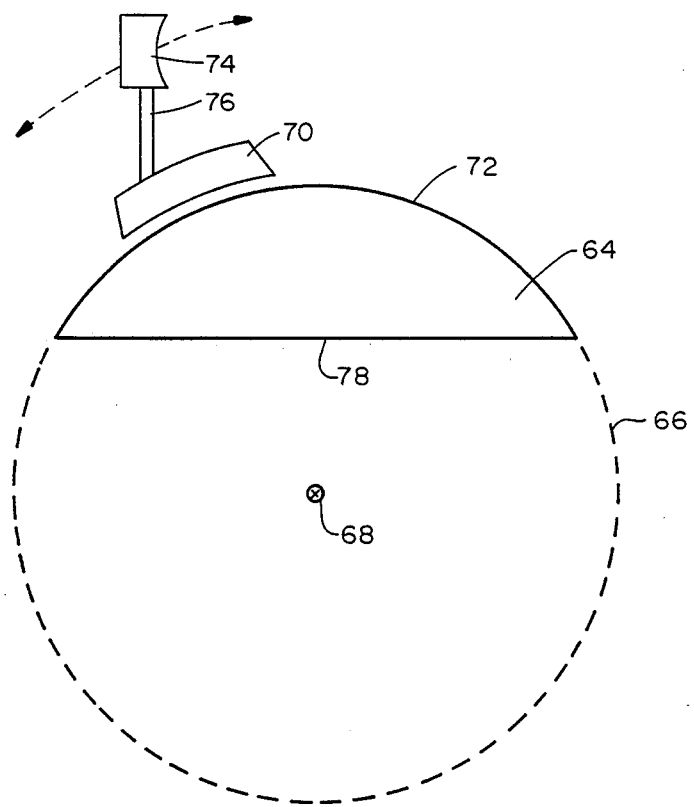
FIG. 5 is a diagram of one hinge design that may be used to implement the teachings of the invention to achieve a pivot point which is very far away from the mirror being translated.

Referring to FIG. 5 there is shown one possible hinge design for the pivot point for any of the mirrors described above. The hinge design is comprised of a segment 64 of a larger circle 66 which has its center at 68. A sliding member 70 is coupled to slide along the curved surface 72 of the segment 64. The sliding member 70 has attached to it a mirror 74 by a connecting member 76. As the sliding member 70 slides across the surface 72, the mirror 74 is translated along an arc centered at an apparent pivot point 68. The hinge design of FIG. 5 allows pivot points which are much farther away from the mirror 74 to be implemented without requiring the pivot point to be physically located inside the laser package. The circle segment 64 may be attached to the dye laser structure at surface 78. This allows the apparent pivot point 68 to lie outside the laser package if necessary. The advantage of this hinge design is that pivot points which are further away may be used. As noted earlier herein, the farther the pivot point 68 is away from the mirror 74, the closer to a straight line is the translation of the focal point of that mirror.

Figure 6:
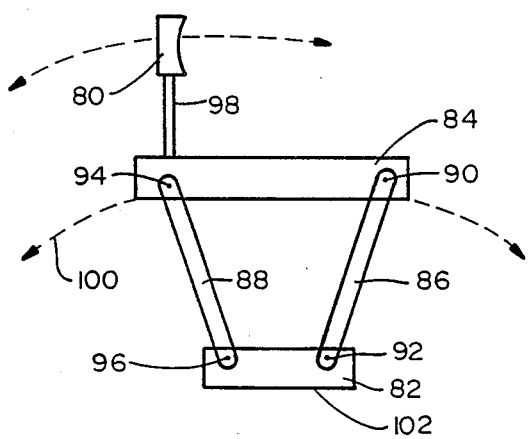
FIG. 6 is another possible hinge design which may be used for achieving a pivot point having a very large apparent distance from the mirror being translated about the pivot point.

Referring to FIG. 6, there is shown another hinge design for a mirror 80 to allow the mirror to pivot about an apparent pivot point which is farther away from the mirror 80 than the actual point of mounting of the mirror to the dye laser frame. In this hinge design, a bottom plate 82 is coupled to a top plate 84 by two connecting members 86 and 88 which are attached at each end by pivotal connections to the members 82 and 84. The member 86 is attached at a pivot point 90 to the member 84 and at a pivot point 92 to the member 82. The connecting member 88 is connected to the top plate 84 at a pivot point 94 and to the bottom plate 82 at a pivot point 96. The mirror 80 is coupled to the top plate 84 by a connecting structure 98. In operation, the hinge of FIG. 6 can be moved such that the top plate 84 is translated with respect to the bottom plate 82 along an arc shown at 100. The apparent center of this arc 100 is located further away from mirror 80 than the bottom plate 82. The bottom plate 82 can be attached to the dye laser frame at surface 102.

Although the invention has been described in terms of the preferred embodiment disclosed herein, those skilled in the art will appreciate numerous modifications which may be made without departing from the true spirit and scope of the invention, all such modifications are intended to be included in the scope of the claims appended hereto.

I claim:

1. A method for tuning a dye laser including an excitation beam, a dye jet and a mirror having a curved surface and a focal point, comprising the steps of:
   locating a pivot point at a relatively large distance from the mirror;
   positioning the mirror in a location so as to intersect the excitation beam at an angle at a variable intersection point on the curved surface and to position the focal point in a region within the dye jet;
   mounting the mirror at said location by means of a mirror support arm rotatably supported at said pivot point; and
   pivoting the mirror about said pivot point by movement of said arm for varying said intersection point so as to move the focal point, with variations in said intersection point being compensated by changes in said angle of intersection of the excitation beam with the curved surface such that the focal point is translated along a substantially straight line within the dye jet when the mirror is pivoted about said pivot point.

2. The method of claim 1, wherein the step of locating the pivot point includes the step of locating the pivot point such that the substantially straight line deviates from a straight line by only a few thousandths of an inch.

3. A method tuning a dye laser having a laser cavity and first and second mirror positioned in the laser cavity, each of the first and second mirrors for focusing a light beam at first and second focal points, respectively, within a dye jet, the dye laser further having a pump mirror for focusing excitation light at a third focal point within the dye jet, comprising the steps of:
   locating a first pivot point on said laser at a relatively large first distance from the first mirror;
   mounting the first mirror at a first location by means of a first arm rotatably supported at said first pivot point;
   locating a second pivot point on said laser at a relatively large second distance from the second mirror;
   mounting the second mirror at a second location by means of a second arm rotatably supported at said second pivot point;
   locating a third pivot point on said laser at a relatively large third distance from the pump mirror;
   mounting the pump mirror at a third location by means of a third arm rotatably supported at said third pivot point, with said first, second and third pivot points being located such that rotation of said first, second and third arms causes substantially linear translation of the first, second and third focal points, respectively, within the dye jet; and
   rotating said first, second and third arms so as to maximize the intersection volume of each of the first, second and third focal points with the dye jet.

4. The method of claim 3 wherein each of the steps of locating the first, second and third pivot points is performed so that said translation of each of the first, second and third focal points deviates from a straight line by only a few thousandths of an inch.

5. The method of claim 4, wherein the steps of locating the first, second and third pivot points are performed such that the first, second and third focal points overlap in an intersection volume of said beams of light reflected between said first and second mirrors and said dye jet.

6. A method of tuning a dye laser having a dye jet and a pump mirror for reflecting a beam of excitation light toward the dye jet, thereby causing laser light to be emitted from the dye jet, and having first and second laser cavity mirrors for reflecting the laser light back through said dye jet, wherein each mirror has a focal point, comprising the steps of:
   locating a pivot point for each said mirror such that each of said mirrors may be pivoted about its corresponding pivot point so as to move the focal point of each mirror along a a substantially straight line;
   pivoting said first and second mirrors around their respective pivot points to place the focal points for each said mirror with said dye jet; and
   pivoting said pump mirror around its pivot point such that its focal point is moved within said dye jet so as to a t least partially intersect the volume of said dye jet within the focal points of said first and second mirrors.

7. The method of claim 6 wherein the step of pivoting said pump mirror is performed so as to maximize the degree of intersection between the light beam reflected from said pump mirror and the volume in the dye jet intersected by the beam reflected between the first and second mirrors.

8. The method of claim 7 wherein the step of picking the pivot points of for each of said mirrors is performed so that the actual paths traveled by each focal point as the corresponding mirror is rotated about its respective pivot point deviates from a straight line by only a few thousandths of an inch.

* * * * *